United States Patent
Matsueda et al.

(10) Patent No.: US 8,318,632 B2
(45) Date of Patent: Nov. 27, 2012

(54) EXHAUST GAS PURIFICATION CATALYST

(75) Inventors: Satoshi Matsueda, Kakegawa (JP); Akimasa Hirai, Kakegawa (JP); Kenichi Taki, Kakegawa (JP); Keiichi Narita, Kakegawa (JP); Yuji Yabuzaki, Kakegawa (JP); Daisuke Ochiai, Kakegawa (JP)

(73) Assignee: Cataler Corporation, Kakegawa-shi (JP)

( * ) Notice: Subject to any disclaimer, the term of this patent is extended or adjusted under 35 U.S.C. 154(b) by 0 days.

(21) Appl. No.: 13/163,341

(22) Filed: Jun. 17, 2011

(65) Prior Publication Data

US 2011/0245076 A1 Oct. 6, 2011

Related U.S. Application Data

(63) Continuation of application No. PCT/JP2009/071172, filed on Dec. 18, 2009.

(30) Foreign Application Priority Data

Dec. 19, 2008 (JP) ............................ 2008-324265

(51) Int. Cl.
*B01J 23/00* (2006.01)
*B01J 21/00* (2006.01)
*B01J 20/00* (2006.01)
*B01J 29/00* (2006.01)
*B01J 35/00* (2006.01)
*B01J 37/00* (2006.01)

(52) U.S. Cl. ........ 502/328; 502/262; 502/263; 502/327; 502/332; 502/333; 502/334; 502/339; 502/341; 502/355; 502/415; 502/439; 502/527.12; 502/527.13; 502/527.19

(58) Field of Classification Search .......... 502/262, 502/263, 327, 328, 332–334, 339, 341, 355, 502/415, 439, 527.12, 527.13, 527.19
See application file for complete search history.

(56) References Cited

U.S. PATENT DOCUMENTS

| 4,128,506 A | * | 12/1978 | Hegedus et al. | ............. 502/334 |
| 5,556,825 A | * | 9/1996 | Shelef et al. | ................. 502/303 |
| 5,559,073 A | * | 9/1996 | Hu et al. | ....................... 502/302 |
| 5,597,771 A | * | 1/1997 | Hu et al. | ....................... 502/304 |
| 5,677,258 A | * | 10/1997 | Kurokawa et al. | ............ 502/303 |

(Continued)

FOREIGN PATENT DOCUMENTS

JP 07-289896 A 11/1995

(Continued)

OTHER PUBLICATIONS

International Search Report mailed by the International Searching Authority (ISA/JP) on Mar. 2, 2010 in connection with PCT International Application No. PCT/JP2009/071172, filed Dec. 18, 2009.

(Continued)

*Primary Examiner* — Cam N. Nguyen
(74) *Attorney, Agent, or Firm* — John P. White; Cooper & Dunham LLP

(57) ABSTRACT

An exhaust gas purification catalyst includes a substrate, and a first catalyst layer formed on the substrate, the first catalyst layer containing palladium and/or platinum and alumina doped with an alkaline-earth metal element. The exhaust gas purification catalyst has a correlation coefficient $\rho_{Al,AE}$ given by the following formula of 0.75 or more:

$$\rho_{Al,AE} = \frac{C_{Al,AE}}{\sigma_{Al}\sigma_{AE}}. \tag{1}$$

10 Claims, 2 Drawing Sheets

U.S. PATENT DOCUMENTS

| | | | | |
|---|---|---|---|---|
| 5,795,840 | A * | 8/1998 | Takami et al. | 502/327 |
| 5,948,723 | A * | 9/1999 | Sung | 502/303 |
| 5,958,826 | A * | 9/1999 | Kurokawa et al. | 502/303 |
| 5,990,038 | A * | 11/1999 | Suga et al. | 502/303 |
| 6,139,808 | A * | 10/2000 | Mizuno et al. | 422/180 |
| 6,217,831 | B1 * | 4/2001 | Suzuki et al. | 422/177 |
| 6,221,804 | B1 * | 4/2001 | Yamada et al. | 502/326 |
| 6,391,822 | B1 * | 5/2002 | Dou et al. | 502/325 |
| 6,395,675 | B1 * | 5/2002 | Suga et al. | 502/326 |
| 6,413,483 | B1 * | 7/2002 | Brisley et al. | 423/239.1 |
| 6,413,904 | B1 * | 7/2002 | Strehlau et al. | 502/328 |
| 6,420,306 | B2 * | 7/2002 | Kurokawa et al. | 502/261 |
| 6,432,859 | B1 * | 8/2002 | Iwakuni et al. | 502/66 |
| 6,500,392 | B2 * | 12/2002 | Mizuno et al. | 422/177 |
| 6,514,905 | B1 * | 2/2003 | Hanaki et al. | 502/328 |
| 6,677,264 | B1 * | 1/2004 | Klein et al. | 502/74 |
| 6,764,665 | B2 * | 7/2004 | Deeba et al. | 423/239.1 |
| 6,777,370 | B2 * | 8/2004 | Chen | 502/241 |
| 6,797,663 | B2 * | 9/2004 | Watanabe et al. | 502/66 |
| 7,022,646 | B2 * | 4/2006 | Li | 502/339 |
| 7,071,141 | B2 * | 7/2006 | Gandhi et al. | 502/302 |
| 7,169,734 | B2 * | 1/2007 | Nakamura et al. | 502/302 |
| 7,265,073 | B2 * | 9/2007 | Yoshikawa | 502/66 |
| 7,287,370 | B2 * | 10/2007 | Rajaram et al. | 60/274 |
| 7,329,629 | B2 * | 2/2008 | Gandhi et al. | 502/325 |
| 7,374,729 | B2 * | 5/2008 | Chen et al. | 422/177 |
| 7,396,516 | B2 * | 7/2008 | Fisher et al. | 423/213.2 |
| 7,515,510 | B2 * | 4/2009 | Lee et al. | 369/47.14 |
| 7,550,124 | B2 * | 6/2009 | Chen et al. | 423/213.2 |
| 7,737,077 | B2 * | 6/2010 | Kitamura et al. | 502/326 |
| 7,749,472 | B2 * | 7/2010 | Chen et al. | 423/213.2 |
| 7,754,171 | B2 * | 7/2010 | Chen et al. | 423/213.2 |
| 7,799,298 | B2 * | 9/2010 | Pfeifer et al. | 423/213.2 |
| 7,851,405 | B2 * | 12/2010 | Wakamatsu et al. | 502/332 |
| 7,875,250 | B2 * | 1/2011 | Nunan | 422/177 |
| 7,879,755 | B2 * | 2/2011 | Wassermann et al. | 502/304 |
| 7,923,407 | B2 * | 4/2011 | Goto | 502/327 |
| 8,007,750 | B2 * | 8/2011 | Chen et al. | 423/239.1 |

FOREIGN PATENT DOCUMENTS

| | | |
|---|---|---|
| JP | 11-207183 | 8/1999 |
| JP | 2001-070791 A | 3/2001 |
| JP | 2008-100230 A | 5/2008 |
| JP | 2008-253921 A | 10/2008 |

OTHER PUBLICATIONS

Written Opinion of the International Searching Authority mailed by the International Searching Authority (ISA/JP) on Mar. 2, 2010 in connection with PCT International Application No. PCT/JP2009/071172, filed Dec. 18, 2009.

* cited by examiner

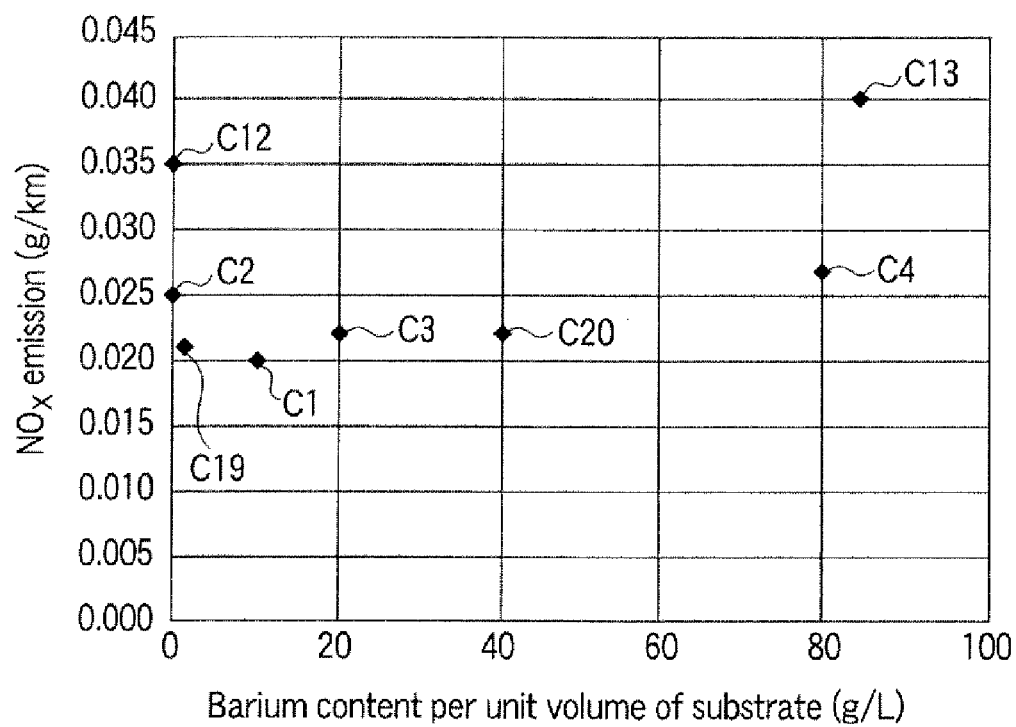
F I G. 4

EXHAUST GAS PURIFICATION CATALYST

CROSS REFERENCE TO RELATED APPLICATIONS

This is a Continuation Application of PCT Application No. PCT/JP2009/071172, filed Dec. 18, 2009, which was published under PCT Article 21(2) in Japanese.

This application is based upon and claims the benefit of priority from prior Japanese Patent Application No. 2008-324265, filed Dec. 19, 2008, the entire contents of which are incorporated herein by reference.

BACKGROUND OF THE INVENTION

1. Field of the Invention

The present invention relates to an exhaust gas purification catalyst.

2. Description of the Related Art

Recently, emission control on automobiles and the like has been strengthened. Therefore, in order to address this issue, various exhaust gas purification catalysts for purifying hydrocarbons (HC), carbon monoxide (CO), nitrogen oxides ($NO_X$) and the like in exhaust gas have been developed.

Many exhaust gas purification catalysts contain palladium and/or platinum as catalytic metals. Palladium and/or platinum play a role for accelerating oxidation reactions of HC and CO and reduction reactions of $NO_X$.

However, palladium and platinum have a problem that they are susceptible to poisoning by HC in exhaust gas. When palladium and/or platinum are poisoned by HC, $NO_X$ reduction reaction on these precious metals becomes difficult to occur. Therefore, a catalyst comprising palladium and/or platinum may sometimes show an insufficient $NO_X$ purification rate specifically under a rich atmosphere in which an HC concentration in exhaust gas is high.

Therefore, in order to suppress this, a technique comprising adding a salt of an alkaline-earth metal element to a catalyst comprising these precious metals has been suggested (see, for example, Patent Literature 1). When such constitution is adopted, poisoning of palladium and platinum by HC is suppressed by the action of the alkaline-earth metal element, whereby exhaust gas purification performances such as an $NO_X$ purification rate can be improved to some extent.

However, there is room for further improvement of exhaust gas purification performances of exhaust gas purification catalysts.

CITATION LIST

Patent Literature

Patent Literature 1: Jpn. Pat. Appln. KOKAI Publication No. 11-207183

BRIEF SUMMARY OF THE INVENTION

The purpose of the present invention is to provide a technique by which excellent exhaust gas purification performances can be achieved.

According to a first aspect of the present invention, there is provided an exhaust gas purification catalyst comprising: a substrate, and a first catalyst layer formed on the substrate, the first catalyst layer comprising palladium and/or platinum and alumina doped with an alkaline-earth metal element and having a correlation coefficient $\rho_{Al,AE}$ given by the following formula (1) of 0.75 or more:

$$\rho_{Al,AE} = \frac{C_{Al,AE}}{\sigma_{Al}\sigma_{AE}} \quad (1)$$

wherein $C_{Al,AE}$, $\sigma_{Al}$ and $\sigma_{AE}$ in the formula (1) are represented by the following formulae (2), (3) and (4), respectively:

$$C_{Al,AE} = \frac{1}{350}\sum_{i=1}^{350}(I_{Al,i} - I_{Al,av})(I_{AE,i} - I_{AE,av}) \quad (2)$$

$$\sigma_{Al} = \sqrt{\frac{1}{350}\sum_{i=1}^{350}(I_{Al,i} - I_{Al,av})^2} \quad (3)$$

$$\sigma_{AE} = \sqrt{\frac{1}{350}\sum_{i=1}^{350}(I_{AE,i} - I_{AE,av})^2} \quad (4)$$

in the formulae (2) to (4), i is a natural number of from 1 to 350, $I_{Al,i}$ is a characteristic X-ray intensity of aluminum that is measured by using an electron beam microanalyzer at the i-th intersection point among 350 intersection points of surfaces that are obtained by dividing the first catalyst layer into 350 equal parts in the thickness direction with a line that is vertical to the main surface of the first catalyst layer, $I_{Al,av}$ is an arithmetic average value of the $I_{Al,i}$ given by the following formula (5):

$$I_{Al,av} = \frac{1}{350}\sum_{i=1}^{350}I_{Al,i} \quad (5)$$

wherein $I_{AE,i}$ is a characteristic X-ray intensity of the alkaline-earth metal element that is measured by using the electron beam microanalyzer at the i-th intersection point, and $I_{AE,av}$ is an arithmetic average value of the $I_{AE,i}$ given by the following formula (6):

$$I_{AE,av} = \frac{1}{350}\sum_{i=1}^{350}I_{AE,i} \quad (6)$$

According to a second aspect of the present invention, there is provided an exhaust gas purification catalyst comprising: a substrate, and a catalyst layer obtainable by applying a slurry comprising palladium and/or platinum and alumina doped with an alkaline-earth metal element onto the substrate.

BRIEF DESCRIPTION OF THE SEVERAL VIEWS OF THE DRAWING

FIG. 4 is a graph that shows an example of the relationship between the amount of barium per unit volume of the substrate and $NO_X$ emission.

DETAILED DESCRIPTION OF THE INVENTION

Figure 1:
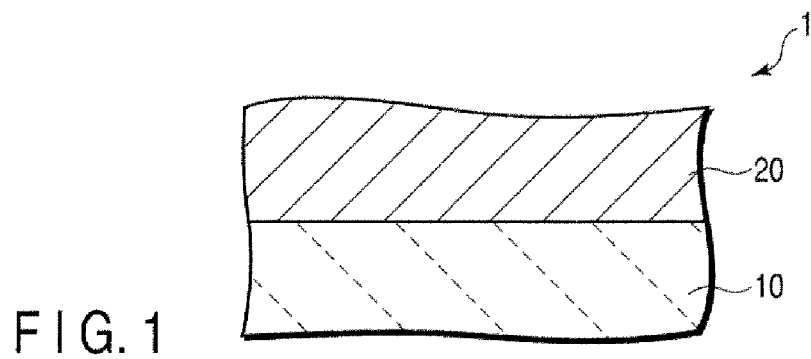
FIG. 1 is a cross-sectional drawing schematically showing the exhaust gas purification catalyst according to the first embodiment of the present invention.

Hereinafter the embodiments of the present invention are explained with reference to the drawings. Throughout all drawings, constitutional elements that exhibit the same or similar function are provided with the same reference numerals, and overlapped explanations are omitted. Furthermore, as used herein, the "composite oxide" means that a plurality of oxides form a solid solution rather than that the plurality of oxides are merely mixed physically. In addition, the "alkaline-earth metal" encompasses beryllium and magnesium.

FIG. 1 is a cross-sectional drawing schematically showing the exhaust gas purification catalyst according to the first embodiment of the present invention.

The exhaust gas purification catalyst 1 comprises a substrate 10, and a catalyst layer 20 formed on the substrate 10.

As the substrate 10, for example, a monolith honeycomb type substrate is used. Typically, the substrate is made of a ceramic such as cordierite.

The catalyst layer 20 comprises palladium and/or platinum and alumina doped with an alkaline-earth metal element.

The palladium and/or platinum are typically supported on the alumina doped with the alkaline-earth metal element. The palladium and/or platinum play a role of catalyzing oxidization reactions of HC and CO and reduction reaction of $NO_X$.

The alumina doped with the alkaline-earth metal element has a structure in which the alkaline-earth metal element is positioned inside of each alumina particle. The alkaline-earth metal element may substitute for a part of atoms that constitute crystal lattices of the alumina, or may be positioned in voids between these atoms. Alternatively, a part of the alkaline-earth metal element may substitute for a part of the atoms that constitute the crystal lattices of the alumina and another part of the alkaline-earth metal element may be positioned in the voids between these atoms.

The alkaline-earth metal element doped in alumina plays a role of suppressing HC poisoning of the palladium and/or platinum. As the alkaline-earth metal element, for example, barium, calcium, strontium, or a combination of two or more of these is used.

When a mixture of alumina and a salt of an alkaline-earth metal element are used as the material for the catalyst layer 20, contact of the palladium and/or platinum supported on the alumina and the alkaline-earth metal element is relatively difficult to occur. Namely, although a part of the alkaline-earth metal element contacts the above-mentioned palladium and/or platinum, another part of the alkaline-earth metal element does not contact the above-mentioned palladium and/or platinum. Furthermore, the alkaline-earth metal element that does not contact the palladium and/or platinum does not contribute to suppression of HC poisoning of the palladium and/or platinum. Therefore, when such alkaline-earth metal element is present in a large amount, improvement of the exhaust gas purification performances of the catalyst may sometimes become difficult.

On the other hand, when the alumina doped with the alkaline-earth metal element is used, the alkaline-earth metal element can be distributed at high uniformity in the structure of the alumina. In this case, the alkaline-earth metal element doped on the alumina and the palladium and/or platinum carried on the alumina are in close proximity with each other. Namely, in this case, the alkaline-earth metal element contacts the palladium and/or platinum more easily than when a mixture of alumina and a salt of an alkaline-earth metal element are used. Therefore, in this case, HC poisoning of the palladium and/or platinum can be suppressed more efficiently. Therefore, by adopting such a constitution, particularly excellent exhaust gas purification performances can be achieved.

The uniformity of distribution of the alkaline-earth metal element in the catalyst layer 20 is evaluated as follows.

First, 350 surfaces that are obtained by dividing the gap between the surface of the catalyst layer 20 and the surface of the catalyst layer 20 on the side of the substrate 10 into 350 equivalent parts are considered. Then, 350 intersection points of these 350 surfaces and a straight line that is vertical to the main surface of the catalyst layer 20 are considered. Hereinafter, these 350 intersection points are referred to as points $P_i$ (i=1, 2, . . . , 350; hereinafter the same).

Then, using an electron beam microanalyzer (EPMA) in each of these 350 points $P_i$, the characteristic X-ray intensity $I_{Al,i}$ that corresponds to aluminum and the characteristic X-ray intensity $I_{AE,i}$ that corresponds to the alkaline-earth metal element are measured. Furthermore, the correlation coefficient $\rho_{Al,AE}$ given by the following formula (1) is obtained based on these measurement values.

$$\rho_{Al,AE} = \frac{C_{Al,AE}}{\sigma_{Al}\sigma_{AE}} \quad (1)$$

In the above-mentioned formula (1), $C_{Al,AE}$ is a covariance of the intensity $I_{Al,i}$ and the intensity $I_{AE,i}$, $\sigma_{Al}$ is the standard deviation of the intensity $I_{Al,i}$, and $\sigma_{AE}$ is the standard deviation of the intensity $I_{AE,i}$. The covariance $C_{Al,AE}$ and the standard deviations $\sigma_{Al}$ and $\sigma_{AE}$ are given by the following formulae (2) to (4), respectively.

$$C_{Al,AE} = \frac{1}{350}\sum_{i=1}^{350}(I_{Al,i} - I_{Al,av})(I_{AE,i} - I_{AE,av}) \quad (2)$$

$$\sigma_{Al} = \sqrt{\frac{1}{350}\sum_{i=1}^{350}(I_{Al,i} - I_{Al,av})^2} \quad (3)$$

$$\sigma_{AE} = \sqrt{\frac{1}{350}\sum_{i=1}^{350}(I_{AE,i} - I_{AE,av})^2} \quad (4)$$

In each of the above-mentioned formulae, $I_{Al,av}$ the arithmetic average value of the intensity $I_{Al,i}$ given by the following formula (5), and $I_{AE,av}$ is the arithmetic average value of the intensity $I_{AE,i}$ given by the following formula (6).

$$I_{Al,av} = \frac{1}{350}\sum_{i=1}^{350} I_{Al,i} \quad (5)$$

$$I_{AE,av} = \frac{1}{350}\sum_{i=1}^{350} I_{AE,i} \quad (6)$$

The correlation coefficient $\rho_{Al,AE}$ represented by the formula (1) serves as an index that shows the correlation between the distribution of aluminum and the distribution of the alkaline-earth metal element in the catalyst layer 20. Namely, when the alkaline-earth metal element is distributed relatively uniformly in the catalyst layer 20, the correlation coefficient $\rho_{Al,AE}$ is a large positive value of 1 or less. On the other hand, when the alkaline-earth metal element is distributed relatively ununiformly in the catalyst layer 20, the correlation coefficient $\rho_{Al,AE}$ is a small value close to 0.

Thus, by using the correlation coefficient $\rho_{Al,AE}$, the uniformity of distribution of the alkaline-earth metal element in the catalyst layer 20 can be evaluated. In the exhaust gas purification catalyst 1, the correlation coefficient $\rho_{Al,AE}$ of the catalyst layer 20 is 0.75 or more, and typically 0.79 or more.

The catalyst layer 20 may further comprise an oxygen storage material. As the oxygen storage material, for example, cerium oxide, zirconium oxide, or a composite oxide thereof is used. Alternatively, rare earth oxides such as praseodymium oxide, lanthanum oxide and yttrium oxide, transition metal oxides such as iron oxide and manganese oxide, or composite oxides thereof may also be used as the oxygen storage material. Alternatively, mixtures or composite oxides of the above-mentioned compound may also be used as the oxygen storage material. Typically, a composite oxide of cerium oxide and zirconium oxide; a composite oxide of cerium oxide, zirconium oxide and lanthanum oxide; or a composite oxide of cerium oxide, zirconium oxide, lanthanum oxide and yttrium oxide is used as the oxygen storage material.

The catalyst layer 20 may further comprise a rare earth element. The rare earth element has a function of improving the $NO_X$ purification performance of the exhaust gas purification catalyst 1 without decreasing the HC purification performance thereof. As the rare earth element, for example, neodymium, lanthanum, praseodymium or yttrium can be used.

The catalyst layer 20 may further comprise zeolite. Zeolite has a high specific surface area and is excellent in performance of adsorbing HC in exhaust gas. Therefore, the HC purification performance of the exhaust gas purification catalyst 1 can further be improved by incorporating zeolite.

The catalyst layer 20 may further comprise a binder. The binder plays a rule to improve the durability of the catalyst by strengthening the bonding between a plurality of particles that constitute the catalyst layer 20. As the binder, for example, an alumina sol, a titania sol or a silica sol is used.

In the exhaust gas purification catalyst 1, the content of the alkaline-earth metal element per unit volume of the substrate 10 is, for example, in the range of from 0.1 g/L to 80 g/L, typically in the range of from 1 g/L to 40 g/L. When the content is less than 0.1 g/L, suppression of HC poisoning of the palladium and/or platinum by the alkaline-earth metal element may sometimes become insufficient. When the content is more than 80 g/L, the heat resistance of the catalyst layer 20 may be decreased, and coagulation of the palladium and/or platinum may occur easily.

In the exhaust gas purification catalyst 1, the amount of the alkaline-earth metal element to be doped is adjusted to the range of, for example, from 0.1% by mass to 20% by mass, typically the range of from 1% by mass to 10% by mass based on the mass of the alumina doped with the alkaline-earth metal element. When the amount of doping is less than 0.1% by mass, suppression of HC poisoning of the palladium and/or platinum by the alkaline-earth metal element may sometimes become insufficient. When the amount of doping is more than 20% by mass, it is possible that the heat resistance of the alumina doped with an alkaline-earth metal element is decreased, and the palladium and/or platinum may coagulate easily.

Moreover, in the exhaust gas purification catalyst 1, the mass ratio of the content of the alkaline-earth metal element to the content of palladium and/or platinum in the catalyst layer 20 is adjusted to, for example, the range of from 0.1 to 80, typically the range of from 0.5 to 40. When the mass ratio is less than 0.1, suppression of HC contamination of the palladium and/or platinum by the alkaline-earth metal element may sometimes be insufficient. When the mass ratio is more than 80, coagulation of the palladium and/or platinum may occur easily.

The alumina doped with the alkaline-earth metal element is prepared, for example, as follows. Namely, at first, a mixed aqueous solution comprising aluminum nitrate, a carbonate of an alkaline-earth metal element and citric acid is prepared. Then, hydrazine is added to this mixed aqueous solution. Thereafter, the reaction system is heated under stirring to give a precipitate. The precipitate is filtered off, and the obtained filtration cake is dried. The obtained solid is then calcined. By such means, the alumina doped with the alkaline-earth metal element is obtained.

The catalyst layer 20 of the exhaust gas purification catalyst 1 can be obtained, for example, by applying a slurry comprising palladium and/or platinum and the alumina doped with the alkaline-earth metal element to the substrate 10.

When palladium is used as the constitutional component for the catalyst layer 20, as a material for the above-mentioned slurry, for example, a palladium salt such as palladium nitrate or a palladium complex is used. When platinum is used as a constitutional component for the catalyst layer 20, for example, a platinum complex or platinum salt such as dinitrodiamine platinum nitrate is used as a material for the above-mentioned slurry.

The exhaust gas purification catalyst 1 may further comprise another catalyst layer on the catalyst layer 20, or between the catalyst layer 20 and the substrate 10. In this case, the catalyst layer 20 and other catalyst layer are different from each other in, for example, the kind, the content and the like of the catalytic metal. By employing such embodiments, the exhaust gas purification performances of the exhaust gas purification catalyst 1 can be optimized.

Figure 2:
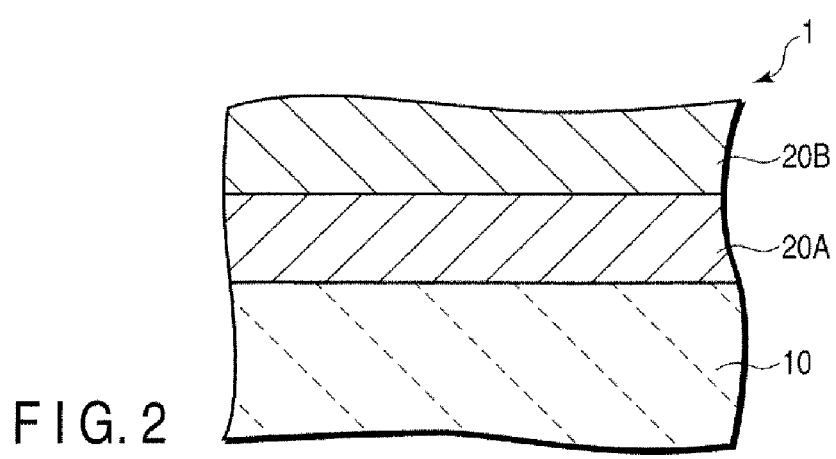
FIG. 2 is a cross-sectional drawing that schematically shows the exhaust gas purification catalyst of the second embodiment of the present invention.

FIG. 2 is a cross-sectional drawing that schematically shows the exhaust gas purification catalyst of the second embodiment of the present invention.

The exhaust gas purification catalyst 1 comprises substrate 10, first catalyst layer 20A formed on the substrate 10, and second catalyst layer 20B formed on the first catalyst layer 20A. The first catalyst layer 20A has a similar constitution to that of the catalyst layer 20 as explained with reference to FIG. 1. Namely, the exhaust gas purification catalyst 1 has a constitution that is similar to that of the exhaust gas purification catalyst as explained with reference to FIG. 1, except that it further comprises the second catalyst layer 20B.

The second catalyst layer 20B comprises rhodium. Rhodium plays a role to catalyze the oxidation reactions of HC and CO and the reduction reaction of $NO_X$.

The second catalyst layer 20B may further comprise alumina.

The second catalyst layer 20B is typically free from an alumina doped with an alkaline-earth metal element. The second catalyst layer 20B may comprise the alumina doped with an alkaline-earth metal element. However, in this case, the content of the alkaline-earth metal element per unit volume of the substrate 10 in the second catalyst layer 20B is typically smaller than the content of the alkaline-earth metal element per unit volume of the substrate 10 in the first catalyst layer 20A.

The second catalyst layer 20B may further comprise an oxygen storage material. As the oxygen storage material, a material similar to that mentioned for the catalyst layer 20 of the exhaust gas purification catalyst 1 as explained with reference to FIG. 1 can be used. As the oxygen storage material, a composite oxide of cerium oxide and zirconium oxide is typically used.

The second catalyst layer 20B may further comprise a rare earth element, zeolite or a binder. As these elements or materials, the ones similar to those previously mentioned for the catalyst layer 20 can be used.

Figure 3:
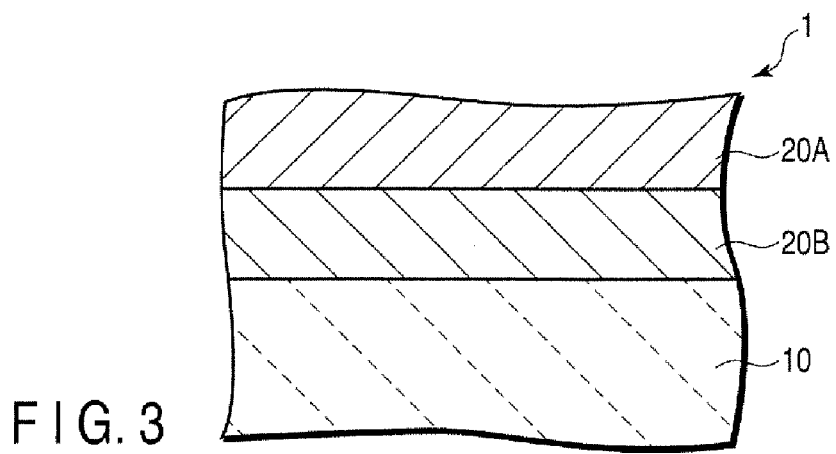
FIG. 3 is a cross-sectional drawing that schematically shows the exhaust gas purification catalyst of the third embodiment of the present invention.

FIG. 3 is a cross-sectional drawing that schematically shows the exhaust gas purification catalyst of the third embodiment of the present invention.

The exhaust gas purification catalyst 1 comprises substrate 10, second catalyst layer 20B formed on the substrate 10, and the first catalyst layer 20A formed on the second catalyst layer 20B. Namely, the exhaust gas purification catalyst 1 has a similar constitution to that of the exhaust gas purification catalyst as explained with reference to FIG. 2, except that the order of lamination of the first catalyst layer 20A and the second catalyst layer 20B is inverted.

Note that, when the constitutions that have been explained with referring to FIG. 2 and FIG. 3 are adopted, the uniformity of distribution of the alkaline-earth metal element in each of the first catalyst layer 20A and the second catalyst layer 20B can be evaluated, for example, as follows. Hereinafter the case when the catalyst layers 20A and 20B are disposed by the constitution as shown in FIG. 2 is explained as an example.

First, 350 surfaces that are obtained by dividing the gap between the surface of the first catalyst layer 20A on the side of the second catalyst layer 20B and the surface of the first catalyst layer 20A on the side of the substrate 10 into 350 equivalent parts are considered. Then, 350 intersection points of these 350 surfaces and a straight line that is vertical to the main surface of the first catalyst layer 20A are considered. Then, these 350 intersection points $P_j$ (j=1, 2, . . . , 350) are measured by EPMA. After that, the correlation coefficient $\rho_{Al,AE}$ in the first catalyst layer 20A was calculated in a similar manner to that previously mentioned for the catalyst layer 20.

Furthermore, 350 surfaces that are obtained by dividing the gap between the surface of the second catalyst layer 20B and the surface of the second catalyst layer 20B on the side of the first catalyst layer 20A into 350 equivalent parts are considered. Then, 350 intersection points of these 350 surfaces and a straight line that is vertical to the main surface of the second catalyst layer 20B are considered. Then, these 350 intersection points $P_k$ (k=1, 2, . . . , 350) are measured by EPMA. After that, the correlation coefficient $\rho_{Al,AE}$ in the second catalyst layer 20B was calculated in a similar manner to that previously mentioned for the catalyst layer 20.

In the exhaust gas purification catalysts 1 explained with reference to FIG. 2 and FIG. 3, the correlation coefficient $\rho_{Al,AE}$ in the first catalyst layer 20A is 0.75 or more, typically 0.79 or more. Namely, in these exhaust gas purification catalysts 1, the alkaline-earth metal element is distributed relatively uniformly at least in the first catalyst layer 20A.

EXAMPLES

Preparation of Alumina Doped with an Alkaline-Earth Metal Element

Alumina doped with an alkaline-earth metal element was prepared as follows. Namely, at first, a mixed aqueous solution comprising aluminum nitrate, a carbonate of an alkaline-earth metal element and citric acid was prepared. Hydrazine was then added to the mixed aqueous solution. Thereafter, the reaction system was stirred at 70° C. over 24 hours to give a precipitate. The precipitate is filtered off, and the obtained filtration cake was dried. Then, the obtained solid was calcined at 900° C. over 5 hours. By such means, alumina doped with an alkaline-earth metal element was obtained.

The amount of the doped alkaline-earth metal element was suitably adjusted by varying the mass ratio of aluminum nitrate and the carbonate of the alkaline-earth metal element.

Example 1

Production of Catalyst C1

Alumina doped with 10% by mass of barium was prepared. Hereinafter this is referred to as "Ba alumina BA1".

Furthermore, a composite oxide of cerium oxide and zirconium oxide was prepared. In this composite oxide, the molar ratio of the cerium element with respect to the zirconium element was 7/3. Hereinafter this composite oxide is referred to as "CZ oxide".

In addition, a monolith honeycomb substrate comprising cordierite, having an entire length of 100 mm, a volume of 1 L and a cell number of 900 cells per a square inch was prepared (1 inch=2.54 cm).

100 g of Ba alumina BA1, 100 g of CZ oxide, and an aqueous solution of palladium nitrate containing 1 g of palladium were mixed to prepare a slurry. Hereinafter the slurry is referred to as "slurry S1".

The slurry S1 was then applied to the above-mentioned substrate. This was then dried at 250° C. over 1 hour, and calcined at 500° C. over 1 hour.

By the above-mentioned means, an exhaust gas purification catalyst was produced. Hereinafter the catalyst is referred to as "catalyst C1".

Example 2

Production of Catalyst C2

Alumina doped with 0.1% by mass of barium was prepared. Hereinafter this is referred to as "Ba alumina BA2".

A slurry was prepared in a similar manner to that for the slurry S1, except that Ba alumina BA2 was used instead of Ba alumina BA1. Hereinafter this slurry is referred to as "slurry S2".

Then, an exhaust gas purification catalyst was produced in a similar manner to that for the catalyst C1, except that the slurry S2 was used instead of the slurry S1. Hereinafter this catalyst is referred to as "catalyst C2".

Example 3

Production of Catalyst C3

Alumina doped with 20% by mass of barium was prepared. Hereinafter this is referred to as "Ba alumina BA3".

A slurry was prepared in a similar manner to that for the slurry S1, except that Ba alumina BA3 was used instead of Ba alumina BA1. Hereinafter this slurry is referred to as "slurry S3".

Then, an exhaust gas purification catalyst was produced in a similar manner to that for the catalyst C1, except that the slurry S3 was used instead of the slurry S1. Hereinafter this catalyst is referred to as "catalyst C3".

Example 4

Production of Catalyst C4

A slurry was prepared in a similar manner to that for the slurry S3, except that 400 g of Ba alumina BA3 was used instead of 100 g of Ba alumina BA3, and 100 g of CZ oxide was used instead of 50 g of CZ oxide. Hereinafter this slurry is referred to as "slurry S4".

Then, an exhaust gas purification catalyst was produced in a similar manner to that for the catalyst C3, except that the slurry S4 was used instead of the slurry S3. Hereinafter this catalyst is referred to as "catalyst C4".

Example 5

Production of Catalyst C5

A slurry was prepared in a similar manner to that for the slurry S1, except that 50 g of Ba alumina BA1 was used instead of 100 g of Ba alumina BA1, 100 g of CZ oxide was used instead of 50 g of CZ oxide, and palladium nitrate containing 0.5 g of palladium was used instead of palladium nitrate containing 1 g of palladium. Hereinafter this slurry is referred to as "slurry S5".

A composite oxide of cerium oxide and zirconium oxide was prepared. In this composite oxide, the molar ratio of the cerium element with respect to the zirconium element was 3/7. Hereinafter this composite oxide is referred to as "ZC oxide"

50 g of alumina, 50 g of ZC oxide, and an aqueous solution of rhodium nitrate containing 0.5 g of rhodium were mixed to prepare a slurry. Hereinafter the slurry is referred to as "slurry S6".

The slurry S5 was then applied to the above-mentioned substrate. This was then dried at 250° C. over 1 hour, and calcined at 500° C. over 1 hour. After that, the slurry S6 was applied to the substrate onto which the slurry S5 had been applied. This was further dried at 250° C. over 1 hour, and calcined at 500° C. over 1 hour.

By the above-mentioned means, an exhaust gas purification catalyst was produced. Hereinafter the catalyst is referred to as "catalyst C5".

Example 6

Production of Catalyst C6

The slurry S6 was applied to the above-mentioned substrate. This was then dried at 250° C. over 1 hour, and calcined at 500° C. over 1 hour. After that, the slurry S5 was applied to the substrate onto which the slurry S6 had been applied. This was further dried at 250° C. over 1 hour, and calcined at 500° C. over 1 hour.

By the above-mentioned means, an exhaust gas purification catalyst was produced. That is, an exhaust gas purification catalyst was produced in a similar manner to that for the catalyst C5, except that the order of application of the slurries S5 and S6 was reversed. Hereinafter the catalyst is referred to as "catalyst C6".

Example 7

Production of Catalyst C7

A slurry was prepared in a similar manner to that for the slurry S1, except that an aqueous solution of dinitrodiamine platinum nitrate containing 1 g of platinum was used instead of the aqueous solution of palladium nitrate containing 1 g of palladium. Hereinafter this slurry is referred to as "slurry S7".

Then, an exhaust gas purification catalyst was produced in a similar manner to that for the catalyst C1, except that the slurry S7 was used instead of the slurry S1. Hereinafter this catalyst is referred to as "catalyst C7".

Example 8

Production of Catalyst C8

A slurry was prepared in a similar manner to that for the slurry S1, except that an aqueous solution of a mixture of palladium nitrate containing 0.5 g of palladium and dinitrodiamine platinum nitrate containing 0.5 g of platinum was used instead of the aqueous solution of palladium nitrate containing 1 g of palladium. Hereinafter this slurry is referred to as "slurry S8".

Then, an exhaust gas purification catalyst was produced in a similar manner to that for the catalyst C1, except that the slurry S8 was used instead of the slurry S1. Hereinafter this catalyst is referred to as "catalyst C8".

Example 9

Production of Catalyst C9

Alumina doped with 10% by mass of strontium was prepared. Hereinafter this is referred to as "Sr alumina".

A slurry was prepared in a similar manner to that for the slurry S1, except that Sr alumina was used instead of Ba alumina BA1. Hereinafter this slurry is referred to as "slurry S9".

Then, an exhaust gas purification catalyst was produced in a similar manner to that for the catalyst C1, except that the slurry S9 was used instead of the slurry S1. Hereinafter this catalyst is referred to as "catalyst C9".

Example 10

Production of Catalyst C10

Alumina doped with 10% by mass of calcium was prepared. Hereinafter this is referred to as "Ca alumina".

A slurry was prepared in a similar manner to that for the slurry S1, except that Ca alumina was used instead of Ba alumina BA1. Hereinafter this slurry is referred to as "slurry S10".

Then, an exhaust gas purification catalyst was produced in a similar manner to that for the catalyst C1, except that the slurry S10 was used instead of the slurry S1. Hereinafter this catalyst is referred to as "catalyst C10".

Example 11

Production of Catalyst C11

Alumina doped with 5% by mass of barium and 5% by mass of strontium was prepared. Hereinafter this is referred to as "BaSr alumina".

A slurry was prepared in a similar manner to that for the slurry S1, except that BaSr alumina was used instead of Ba alumina BA1. Hereinafter this slurry is referred to as "slurry S11".

Then, an exhaust gas purification catalyst was produced in a similar manner to that for the catalyst C1, except that the slurry S11 was used instead of the slurry S1. Hereinafter this catalyst is referred to as "catalyst C11".

Example 12

Production of Catalyst C12

Alumina doped with 0.05% by mass of barium was prepared. Hereinafter this is referred to as "Ba alumina BA4".
A slurry was prepared in a similar manner to that for the slurry S1, except that Ba alumina BA4 was used instead of Ba alumina BA1. Hereinafter this slurry is referred to as "slurry S12".
Then, an exhaust gas purification catalyst was produced in a similar manner to that for the catalyst C1, except that the slurry S12 was used instead of the slurry S1. Hereinafter this catalyst is referred to as "catalyst C12".

Example 13

Production of Catalyst C13

Alumina doped with 21% by mass of barium was prepared. Hereinafter this is referred to as "Ba alumina BA5".
A slurry was prepared in a similar manner to that for the slurry S4, except that Ba alumina BA5 was used instead of Ba alumina BA3. Hereinafter this slurry is referred to as "slurry S13".
Then, an exhaust gas purification catalyst was produced in a similar manner to that for the catalyst C4, except that the slurry S13 was used instead of the slurry S4. Hereinafter this catalyst is referred to as "catalyst C13".

Example 14

Production of Catalyst C14 (Comparative Example)

90 g of alumina, 100 g of CZ oxide, 17 g of barium sulfate, and an aqueous solution of palladium nitrate containing 1 g of palladium were mixed to prepare a slurry. Hereinafter the slurry is referred to as "slurry S14".
Then, an exhaust gas purification catalyst was produced in a similar manner to that for the catalyst C1, except that the slurry S14 was used instead of the slurry S1. Hereinafter this catalyst is referred to as "catalyst C14".
In the catalyst C14, the mass ratio of barium to the sum of alumina and barium was 10% by mass.

Example 15

Production of Catalyst C15 (Comparative Example)

A slurry was prepared in a similar manner to that for the slurry S1, except that 45 g of alumina was used instead of 90 g of alumina, 50 g of CZ oxide was used instead of 100 g of CZ oxide, 8.5 g of barium sulfate was used instead of 17 g of barium sulfate, and palladium nitrate containing 0.5 g of palladium was used instead of palladium nitrate containing 1 g of palladium. Hereinafter this slurry is referred to as "slurry S15".
Then, an exhaust gas purification catalyst was produced in a similar manner to that for the catalyst C5, except that the slurry S15 was used instead of the slurry S5. Hereinafter this catalyst is referred to as "catalyst C15".
In the catalyst C15, the mass ratio of barium to the sum of alumina and barium was 10% by mass.

Example 16

Production of Catalyst C16 (Comparative Example)

An exhaust gas purification catalyst was produced in a similar manner to that for the catalyst C6, except that the slurry S15 was used instead of the slurry S5. Hereinafter this catalyst is referred to as "catalyst C16".
In the catalyst C16, the mass ratio of barium to the sum of alumina and barium was 10% by mass.

Example 17

Production of Catalyst C17 (Comparative Example)

A slurry was prepared in a similar manner to that for the slurry S14, except that an aqueous solution of dinitrodiamine platinum nitrate containing 1 g of platinum was used instead of the aqueous solution of palladium nitrate containing 1 g of palladium. Hereinafter this slurry is referred to as "slurry S16".
An exhaust gas purification catalyst was produced in a similar manner to that for the catalyst C14, except that the slurry S16 was used instead of the slurry S14. Hereinafter this catalyst is referred to as "catalyst C17".
In the catalyst C17, the mass ratio of barium to the sum of alumina and barium was 10% by mass.

Example 18

Production of Catalyst C18 (Comparative Example)

A slurry was prepared in a similar manner to that for the slurry S14, except that an aqueous solution of a mixture of palladium nitrate containing 0.5 g of palladium and dinitrodiamine platinum nitrate containing 0.5 g of platinum was used instead of the aqueous solution of palladium nitrate containing 1 g of palladium. Hereinafter this slurry is referred to as "slurry S17".
An exhaust gas purification catalyst was produced in a similar manner to that for the catalyst C14, except that the slurry S17 was used instead of the slurry S14. Hereinafter this catalyst is referred to as "catalyst C18".
In the catalyst C18, the mass ratio of barium to the sum of alumina and barium was 10% by mass.

Example 19

Production of Catalyst C19

Alumina doped with 1% by mass of barium was prepared. Hereinafter this is referred to as "Ba alumina BA6".
A slurry was prepared in a similar manner to that for the slurry S1, except that Ba alumina BA6 was used instead of Ba alumina BA1. Hereinafter this slurry is referred to as "slurry S18".
Then, an exhaust gas purification catalyst was produced in a similar manner to that for the catalyst C4, except that the slurry S18 was used instead of the slurry S1. Hereinafter this catalyst is referred to as "catalyst C20".

Example 20

Production of Catalyst C20

A slurry was prepared in a similar manner to that for the slurry S4, except that Ba alumina BA3 was used instead of Ba alumina BA1. Hereinafter this slurry is referred to as "slurry S19".

Then, an exhaust gas purification catalyst was produced in a similar manner to that for the catalyst C4, except that the slurry S19 was used instead of the slurry S4. Hereinafter this catalyst is referred to as "catalyst C20".

Example 21

Production of Catalyst C21

A slurry was prepared in a similar manner to that for the slurry S5, except that Ba alumina BA6 was used instead of Ba alumina BA1. Hereinafter this slurry is referred to as "slurry S20".

Then, an exhaust gas purification catalyst was produced in a similar manner to that for the catalyst C5, except that the slurry S20 was used instead of the slurry S5. Hereinafter this catalyst is referred to as "catalyst C21".

Example 22

Production of Catalyst C22

A composite oxide of cerium oxide, zirconium oxide and lanthanum oxide was prepared. In this composite oxide, the molar ratio of the cerium element, zirconium element and lanthanum element was adjusted to 5:3:2. Hereinafter this composite oxide is referred to as "CZL oxide".

A slurry was prepared in a similar manner to that for the slurry S1, except that CZL oxide was used instead of CZ oxide. Hereinafter this slurry is referred to as "slurry S21".

Then, an exhaust gas purification catalyst was produced in a similar manner to that for the catalyst C1, except that the slurry S21 was used instead of the slurry S1. Hereinafter this catalyst is referred to as "catalyst C22".

Example 23

Production of Catalyst C23

A composite oxide of cerium oxide, zirconium oxide, lanthanum oxide, and yttrium oxide was prepared. In this composite oxide, the molar ratio of the cerium element, zirconium element, lanthanum element and yttrium element was adjusted to 5:3:1:1. Hereinafter this composite oxide is referred to as "CZLY oxide".

A slurry was prepared in a similar manner to that for the slurry S1, except that CZLY oxide was used instead of CZ oxide. Hereinafter this slurry is referred to as "slurry S22".

Then, an exhaust gas purification catalyst was produced in a similar manner to that for the catalyst C1, except that the slurry S22 was used instead of the slurry S1. Hereinafter this catalyst is referred to as "catalyst C23".

<Evaluation of Dispersion Property of Alkaline-Earth Metal Element in Catalyst Layer>

For each of the catalysts C1 to C23, the above-mentioned correlation coefficient $\rho_{Al,AE}$ was obtained as follows.

First, each of the catalysts C1 to C23 was cut into a cubic shape of 1 cm×1 cm×1 cm, and used as a sample for EPMA measurement. Furthermore, EPMA measurement was performed for each of the 350 points $P_i$ or $P_j$ (i=1, 2, ..., 350; j=1, 2, ..., 350) that were determined as mentioned previously. Specifically, in each of these points, the characteristic X-ray intensity $I_{Al,i}$ or $I_{Al,j}$ corresponding to aluminum and the characteristic X-ray intensity and $I_{AE,i}$ or $I_{AE,j}$ corresponding to the alkaline-earth metal element were measured. Then, based on the above-mentioned formula, a correlation coefficient $\rho_{Al,AE}$ of the catalyst layer possessed by each catalyst was calculated. The thus-obtained correlation coefficient $\rho_{Al,AE}$ is summarized together with other physical characteristic values in the following Table 1 to Table 3.

TABLE 1

| Catalyst | Alkaline-earth element | Amount of alkaline-earth metal element (g/L) | Amount of doped alkaline-earth metal element (% by mass) | Catalytic metal | Amount of catalytic metal (g/L) | Correlation coefficient $\rho_{Al,AE}$ | Emission NMHC (g/km) | Emission CO (g/km) | Emission NOx (g/km) |
|---|---|---|---|---|---|---|---|---|---|
| C1 | Ba | 10 | 10 | Pd | 1 | 0.82 | 0.015 | 0.120 | 0.020 |
| C2 | Ba | 0.1 | 0.1 | Pd | 1 | 0.78 | 0.018 | 0.129 | 0.025 |
| C3 | Ba | 20 | 20 | Pd | 1 | 0.79 | 0.017 | 0.125 | 0.022 |
| C4 | Ba | 80 | 20 | Pd | 1 | 0.78 | 0.018 | 0.130 | 0.027 |
| C5 | Ba | 5 | 10 | Rh (Upper layer) | 0.5 | | 0.020 | 0.102 | 0.010 |
| | | | | Pd (Lower layer) | 0.5 | 0.81 | | | |
| C6 | Ba | 5 | 10 | Pd (Upper layer) | 0.5 | 0.82 | 0.018 | 0.106 | 0.012 |
| | | | | Rh (Lower layer) | 0.5 | | | | |
| C7 | Ba | 10 | 10 | Pt | 1 | 0.80 | 0.021 | 0.162 | 0.042 |
| C8 | Ba | 10 | 10 | Pd, Pt | 0.5, 0.5 | 0.82 | 0.017 | 0.115 | 0.018 |
| C9 | Sr | 10 | 10 | Pd | 1 | 0.80 | 0.016 | 0.122 | 0.019 |
| C10 | Ca | 10 | 10 | Pd | 1 | 0.81 | 0.018 | 0.123 | 0.022 |
| C11 | Ba, Sr | 5, 5 | 5, 5 | Pd | 1 | 0.80 | 0.015 | 0.121 | 0.020 |

TABLE 2

| Catalyst | Alkaline-earth element | Amount of alkaline-earth metal element (g/L) | Amount of doped alkaline-earth metal element (% by mass) | Catalytic metal | Amount of catalytic metal (g/L) | Correlation coefficient ρAl, AE | Emission NMHC (g/km) | Emission CO (g/km) | Emission NOx (g/km) |
|---|---|---|---|---|---|---|---|---|---|
| C12 | Ba | 0.05 | 0.05 | Pd | 1 | 0.75 | 0.025 | 0.142 | 0.035 |
| C13 | Ba | 84 | 21 | Pd | 1 | 0.76 | 0.026 | 0.147 | 0.040 |
| C14 | Ba | 10 | 0 (BaSO$_4$) | Pd | 1 | 0.59 | 0.029 | 0.167 | 0.043 |
| C15 | Ba | 5 | 0 (BaSO$_4$) | Rh (Upper layer) | 0.5 | | 0.035 | 0.122 | 0.017 |
|  |  |  |  | Pd (Lower layer) | 0.5 | 0.57 |  |  |  |
| C16 | Ba | 5 | 0 (BaSO$_4$) | Pd (Upper layer) | 0.5 | 0.57 | 0.033 | 0.124 | 0.020 |
|  |  |  |  | Rh (Lower layer) | 0.5 |  |  |  |  |
| C17 | Ba | 10 | 0 (BaSO$_4$) | Pt | 1 | 0.58 | 0.041 | 0.213 | 0.091 |
| C18 | Ba | 10 | 0 (BaSO$_4$) | Pd, Pt | 0.5, 0.5 | 0.58 | 0.031 | 0.159 | 0.039 |

TABLE 3

| Catalyst | Alkaline-earth element | Amount of alkaline-earth metal element (g/L) | Amount of doped alkaline-earth metal element (% by mass) | Catalytic metal | Amount of catalytic metal (g/L) | Correlation coefficient ρAl, AE | Emission NMHC (g/km) | Emission CO (g/km) | Emission NOx (g/km) |
|---|---|---|---|---|---|---|---|---|---|
| C19 | Ba | 1 | 1 | Pd | 1 | 0.80 | 0.017 | 0.123 | 0.021 |
| C20 | Ba | 40 | 10 | Pd | 1 | 0.80 | 0.017 | 0.126 | 0.022 |
| C21 | Ba | 0.5 | 1 | Rh (Upper layer) | 0.5 |  | 0.022 | 0.106 | 0.011 |
|  |  |  |  | Pd (Lower layer) | 0.5 | 0.79 |  |  |  |
| C22 | Ba | 10 | 10 | Pd | 1 | 0.82 | 0.012 | 0.103 | 0.014 |
| C23 | Ba | 10 | 10 | Pd | 1 | 0.81 | 0.010 | 0.099 | 0.011 |

In Table 1 to Table 3, the column "Amount of alkaline-earth metal element" describes the mass of the alkaline-earth metal element per unit volume of the substrate. The column "Amount of doped alkaline-earth metal element" describes the amount of the doped alkaline-earth metal element based on the mass of the alumina. Furthermore, the column "Amount of catalytic metal" describes the mass of the catalytic metal per unit volume of the substrate.

<Evaluation of Exhaust Gas Purification Performance>

First, an endurance test corresponding to driving of 60,000 km was performed for each of the catalysts C1 to C23. Then, these were mounted on real vehicles each having an engine of 1.0 L displacement. Subsequently, the real vehicles were each driven on JC08C mode (JC08 mode by cold start) and JC08H mode (JC08 mode by hot start), and the emissions of non-methane hydrocarbons (NMHC), CO and NO$_X$ in each mode were measured. Then, the emissions obtained in each mode were substituted into the following formula, and a combined value of the emissions of NMHC, CO and NO$_X$ by JC08 mode was obtained.

$$E = 0.25 \times E_C + 0.75 \times E_H$$

In the formula, E is the combined value of the emissions of the respective exhaust gases by JC08 mode, $E_C$ is the measurement value of the emission of each exhaust gas by JC08C mode, $E_H$ is the measurement value of the emission of each exhaust gas by JC08H mode. The combined values of the emissions of the respective exhaust gases obtained as above are shown in the above-mentioned Table 1 to Table 3 together with other physical characteristic values.

As is apparent from Table 1 to Table 3, the catalysts C1 to C13 and C19 to C23 had more excellent HC purification performance as compared to that of the catalysts C14 to C18.

Furthermore, the following matter became evident by the comparison of the catalyst C1 and the catalyst C14, the catalyst C5 and the catalyst C15, the catalyst C6 and the catalyst C16, the catalyst C7 and the catalyst C17, and the catalyst C8 and the catalyst C18. Namely, it was clarified that more excellent HC, CO and NO$_X$ purification performances can be achieved by doping the alumina with the alkaline-earth metal element even in the case when the amounts of the alkaline-earth metal element per unit volume of the substrate are similar.

FIG. 4 is a graph that shows an example of the relationship between the amount of barium per unit volume of the substrate and NO$_X$ emission. FIG. 4 shows the NO$_X$ emissions of the catalysts C1 to C4, C12 and C13, and C19 and C20.

As is apparent from FIG. 4, a particularly excellent $NO_X$ purification performance could be achieved by adjusting the amount of the barium per unit volume of the substrate to the range of from 0.1 g/L to 80 g/L. Furthermore, more excellent $NO_X$ purification performance could be achieved by adjusting the amount of the barium per unit volume of the substrate to the range of from 1 g/L to 40 g/L.

What is claimed is:

1. An exhaust gas purification catalyst comprising:
a substrate, and
a first catalyst layer formed on the substrate, the first catalyst layer comprising palladium and/or platinum and alumina doped with an alkaline-earth metal element and having a correlation coefficient $\rho_{Al,AE}$ given by the following formula (1) of 0.75 or more:

$$\rho_{Al,AE} = \frac{C_{Al,AE}}{\sigma_{Al}\sigma_{AE}} \quad (1)$$

wherein $C_{Al,AE}$, $\sigma_{Al}$ and $\sigma_{AE}$ in the formula (1) are represented by the following formulae (2), (3) and (4), respectively:

$$C_{Al,AE} = \frac{1}{350}\sum_{i=1}^{350}(I_{Al,i} - I_{Al,av})(I_{AE,i} - I_{AE,av}) \quad (2)$$

$$\sigma_{Al} = \sqrt{\frac{1}{350}\sum_{i=1}^{350}(I_{Al,i} - I_{Al,av})^2} \quad (3)$$

$$\sigma_{AE} = \sqrt{\frac{1}{350}\sum_{i=1}^{350}(I_{AE,i} - I_{AE,av})^2} \quad (4)$$

in the formulae (2) to (4),
i is a natural number of from 1 to 350,
$I_{Al,i}$ is a characteristic X-ray intensity of aluminum that is measured by using an electron beam microanalyzer at the i-th intersection point among 350 intersection points of surfaces that are obtained by dividing the first catalyst layer into 350 equal parts in the thickness direction with a line that is vertical to the main surface of the catalyst layer,
$I_{Al,av}$ is an arithmetic average value of the $I_{Al,i}$ given by the following formula (5):

$$I_{Al,av} = \frac{1}{350}\sum_{i=1}^{350} I_{Al,i} \quad (5)$$

$I_{AE,i}$ is a characteristic x-ray intensity of the alkaline-earth metal element that is measured by using the electron beam microanalyzer at the i-th intersection point, and
$I_{AE,av}$ is an arithmetic average value of the $I_{Al,i}$ given by the following formula (6):

$$I_{AE,av} = \frac{1}{350}\sum_{i=1}^{350} I_{AE,i}. \quad (6)$$

2. The exhaust gas purification catalyst according to claim 1, wherein the correlation coefficient $\rho_{Al,AE}$ is 0.79 or more.

3. The exhaust gas purification catalyst according to claim 1, wherein the alkaline-earth metal element is barium.

4. The exhaust gas purification catalyst according to claim 1, wherein a content of the alkaline-earth metal element in the first catalyst layer per unit volume of the substrate is in the range of from 0.1 g/L to 80 g/L.

5. The exhaust gas purification catalyst according to claim 1, wherein the amount of the doped alkaline-earth metal element is in the range of from 0.15 by mass to 20% by mass based on mass of the alumina doped with the alkaline-earth metal element.

6. The exhaust gas purification catalyst according to claim 1, wherein mass ratio of a content of the alkaline-earth metal element with respect to a content of the palladium and/or platinum in the first catalyst layer is in the range of from 0.1 to 80.

7. The exhaust gas purification catalyst according to claim 1, further comprising a second catalyst layer formed on the first catalyst layer, the second catalyst layer comprising rhodium.

8. The exhaust gas purification catalyst according to claim 7, wherein the content of the alkaline-earth metal element per unit volume of the substrate in the second catalyst layer is smaller than the content of the alkaline-earth metal element per unit volume of the substrate in the first catalyst layer.

9. The exhaust gas purification catalyst according to claim 1, further comprising a second catalyst layer intervening between the substrate and the first catalyst layer, the second catalyst layer comprising rhodium.

10. The exhaust gas purification catalyst according to claim 9, wherein the content of the alkaline-earth metal element per unit volume of the substrate in the second catalyst layer is smaller than the content of the alkaline-earth metal element per unit volume of the substrate in the first catalyst layer.

* * * * *